United States Patent
Qin et al.

(10) Patent No.: US 6,603,906 B2
(45) Date of Patent: Aug. 5, 2003

(54) MULTI-PORT OPTICAL POWER MONITORING PACKAGE AND METHOD OF MANUFACTURING

(75) Inventors: Yi Qin, Pleasanton, CA (US); Zhouzheng Shi, Union City, CA (US); Kurt R. Francis, Fremont, CA (US)

(73) Assignee: Nexfon Corporation, Fremont, CA (US)

(*) Notice: Subject to any disclaimer, the term of this patent is extended or adjusted under 35 U.S.C. 154(b) by 96 days.

(21) Appl. No.: 09/917,463

(22) Filed: Jul. 28, 2001

(65) Prior Publication Data

US 2003/0021537 A1 Jan. 30, 2003

(51) Int. Cl.[7] .................................................. G02B 6/26
(52) U.S. Cl. ....................................................... 385/48
(58) Field of Search .............................. 385/48, 31, 33, 385/34, 124

(56) References Cited

U.S. PATENT DOCUMENTS

| | | | | |
|---|---|---|---|---|
| 5,062,686 A | * | 11/1991 | Barrow et al. | 385/33 |
| 6,168,319 B1 | * | 1/2001 | Francis | 385/79 |
| 6,343,166 B1 | * | 1/2002 | Hellman et al. | 385/31 |
| 6,360,039 B1 | * | 3/2002 | Bernard et al. | 385/33 |
| 6,519,392 B2 | * | 2/2003 | Im et al. | 385/48 |

* cited by examiner

Primary Examiner—Tulsidas Patel
(74) Attorney, Agent, or Firm—Leonard Tachner

(57) ABSTRACT

An optical power monitor comprises a fiber and ferrule assembly telescopically embedded in a first glass tube enclosure and a collimating lens telescopically embedded in a second glass tube enclosure. The two glass tube enclosures are bonded together at their respective facing axial ends. The collimating lens is at a first end substantially adjacent the fiber and ferrule assembly. A second end of the lens is coated with a partially transmissive mirror surface for passing a portion of incident light to a photon detector which is bonded to the second glass tube enclosure.

11 Claims, 2 Drawing Sheets

MULTI-PORT OPTICAL POWER MONITORING PACKAGE AND METHOD OF MANUFACTURING

BACKGROUND OF THE INVENTION

1. Field of the Invention

The present invention relates to optical monitoring packages in general, and more specifically to multi-port tap monitoring devices and to the manufacturing of such devices with adhesive bonding processes.

2. Background Art

Single-port monitoring packages are widely used in local and long distance optical telecommunication networks. These networks comprise various spectral shaping and isolating optical filter assemblies as parts of dense wavelength division multiplexing (DWDM) systems. The need to design reliable monitors for such systems, which are subject to various thermal and mechanical loads during their 20 to 25 year lifetime, is of significant importance. A typical prior art monitoring assembly is shown in FIG. 1 and comprises two optical glass components; a low percentage 1×2 tap coupler (3) and a single fiber (5) coupled to a photo detector (6). The tap coupler is spliced into the system (1) and the low percentage leg (5) of the coupler is spliced to a single fiber-diode (6) assembly. In a typical monitoring system the above assembly is combined within a single box type enclosure. Such prior art monitoring assemblies have been known to exhibit unstable insertion losses because the coupling of the single fiber to the photodiode and the subsequent alignment of the elements, degrade overall performance of the system, particularly during exposure to ambient operating conditions.

Prior art power tap monitors employ two major designs. One such design is the single 1×2 fiber optic coupler spliced to a pigtailed photodiode of FIG. 1. The other such design comprises a collimating system (9, 10, & 14) with a thin film filter element (15) bonded to a filter holder (12) used as a reflector, coupled to a photo diode (13) as shown in FIG. 2. The prior art design of FIG. 1 requires that the packaging of two separate elements (the coupler (3) and the pigtailed photodiode (3)) and the subsequent splicing of these packages together. The design of FIG. 2 is subject to the same design considerations as a general collimator utilizing a multi-hole circular capillary (9) with relatively short (1.8 mm) fiber-receiving ends. With such input ferrules, the optical fiber (7 & 8) is subjected to S-bending over the short conical end portion, which typically exceeds 50% of the fiber diameter (for a fiber having a 125 $\mu$m diameter on a span of about 12 to 15 diameters in length). This excessive micro-bending increases the insertion losses. Although the multi-capillary design reduces the lateral deflection of the fiber interconnects compared to the elliptical single-capillary design, the short length of the cone end of such ferrules cannot reduce the micro-bending of the fiber and its inherent insertion loss. Fiber-ferrule subassemblies employing such ferrules are manufactured by the steps of: Fabricating the ferrules to hold the optical fibers; inserting the optical fibers stripped of their polymer coating into the respective ferrule capillaries; epoxy bonding them into the ferrule capillaries, including the conical end portions; grinding an 8° facet of the fiber-ferrule; polishing the facet; and depositing an antireflection (AR) coating on the polished surface. Once finished, the fiber-ferrule is aligned and assembled with the GRIN or ball lens collimator, whose surface is coated with antireflection (AR) films, and then embedded into the insulating glass tube, which, in turn, is protected by a metal housing to provide structural integrity, robustness and thermal insulation to the assembly.

There are two different technical solutions used in the design of bonds securing the components of a power monitoring assembly. A low compliance bond between thermally well matched fibers and ferrule, is an approach commonly used by a majority of manufacturers. The adhesives used are heat-curable epoxies with high Young's modulus (E>10,000 psi) and moderate to high thermal expansion coefficients ($\alpha$=40 to 60×10$^{-6}$ °C.$^{-1}$). A typical example would be 353ND Epo-Tek epoxy adhesive. In addition, the bond thickness used is very small.

Silicon adhesives are used to bond thermally mismatched glass tubes with metal housings and glass filters with metal holders. In these joints, a high compliance design is used. The silicones, which can be cured between 20–150° C. in the presence of moisture, are typically characterized by an extremely low Young's Modulus (E<500 psi) and high thermal expansion ($\alpha$=180 to 250×10$^{-6}$ °C.$^{-1}$). A typical example would be DC 577 silicone, which can be used to bond a metal filter holder to a GRIN lens.

Adhesive bonding with subsequent soldering or welding is required to encapsulate a filtering (mirroring) assembly into a final package or power-monitoring device. A precise alignment achieved during initial assembly of a mirror or splitting element prior to final packaging, can be easily degraded due to the high temperature thermal cycle associated with soldering or welding during packaging of the component. Such prior art manufacturing processes and resulting components have several problems resulting from the fact that the optical components experience stresses due to the thermal contraction mismatch between the glass and metal materials; polymerization shrinkage in adhesive bonds; and structural constraints induced by bonding and final soldering during encapsulation. These stresses lead to displacement of optical components during bonding and soldering, resulting in 0.3 to 1.0 dB increase in the insertion loss.

Such a monitoring package enclosure, which is typically formed of six to eight concentric proactive units, has micron transverse tolerances. Maintaining these tolerances requires precision machining, time-consuming alignment, and soldering with frequent rework. As a result of these limitations, the optical performance specifications are degraded and cost is increased. As an example, soldering typically includes several re-flow cycles. These re-flow cycles induce local thermal stresses in the nearby adhesive bonds and leads to the degradation of the polymer adhesive, resulting in repositioning of optical components and a shift in the spectral filter performance. With such designs, soldering may also result in the contamination of optical components through direct contact with molten solder and/or flux.

Although the collimating subassemblies and housings are all cylinders, the alignment of commercially available optical components, which exhibit a random distribution of optical and structural characteristics, requires some lateral and angular repositioning of the subassemblies. This repositioning of the optical subassemblies is limited by the gap in the solder joint and by the ratio of this gap to the length of the subassembly. The lateral and angular repositioning observed in some isolators can be as high as 0.05 to 0.3 mm and 0.5 to 1.5°, respectively. The soldering of non-capillary gaps incurs well-known difficulties such as high volume shrinkage of the solder, void formation, and contamination of optical components.

For many applications, it is desirable to obtain a high accuracy, thermally compensated power-monitoring packages that can be relatively inexpensive and reliable. Additionally, a package design should be adequate not only to mechanically protect the fragile optical components, but also to compensate for and minimize the thermally induced shift in optical performance. Thus, there exists a need for a process for manufacturing a filtering (power-monitoring) multi-port package, which has a construction which is miniaturized, has a low insertion loss, is inexpensive to manufacture and which results in a filtering (power-monitoring) multi-port package capable of reliable, long-term operation.

SUMMARY OF THE INVENTION

The present invention meets the aforementioned need by providing a novel optical filtering assembly for use in temperature-compensated, multi-port power-monitoring packages.

The optical path is comprised of input and reflective optical glass fibers inserted into a multi-capillary glass ferrule to produce a fiber-ferrule sub-assembly and a collimating (GRIN or aspheric) lens. A spectral shaping (reflecting) glass filter is coated directly onto the GRIN lens. The lens collimates the light emitted from the input optical fiber into parallel rays, which hit the filter element. The filter splits the collimated light into two beams. The transmitted beam is a product specific percentage typically small (1% or less) of the total optical power. After the transmitted beam passes through the filter element, it then enters a photon detector. The reflective beam is reflected from the filter element through the lens into the reflective optical fiber. The optical components are assembled and aligned so that the transmitted and reflected light beams are collimated and their insertion losses (IL) are minimized.

The optical monitoring assembly includes two aligned and bonded parts. The first part is the fiber-ferrule which is telescopically embedded into a first thermally and structurally matched insulating and protective glass tube enclosure. A filter/partial mirror coated lens is also telescopically embedded into a second thermally and structurally matched insulating and protective glass tube enclosure such that the location of the fiber-ferrule yields minimizes insertion loss into the reflected fiber. The second assembly part is the photon detector bonded to the second thermally matched glass holder. This second assembly part is aligned to maximize detectable optical power. The filter is coated in a separate process with a partially reflective mirror. The parts are aligned to minimize the insertion losses (IL) in the transmitted and reflected light beams. To provide the full a-thermalization of the assembly, all components, are made from thermally well-matched glasses and a thermally and/or UV curable adhesive with low moisture diffusivity is used in all joints.

The resulting design reduces assembly time, improves long term reliability and reduces the number of components, thus reducing cost.

OBJECTS OF THE INVENTION

It is therefore a principal object of the present invention to provide a multi-port power monitoring optical package which overcomes or substantially reduces the deficiencies of the prior art.

It is an additional object of the present invention to provide a high accuracy, thermally compensated optical power-monitoring assembly for fiber optical systems wherein the assembly is relatively easy to manufacture.

It is yet another object of the invention to provide an optical power-monitoring, multi-port device having a miniaturized structure, a low insertion loss and which is capable of long term reliable operation.

It is still another object of the invention to provide an optical monitoring assembly for use in conjunction with optical fiber telecommunication networks and which has improved temperature compensation.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which.

DETAILED DESCRIPTION OF A PREFERRED EMBODIMENT

Figure 3:
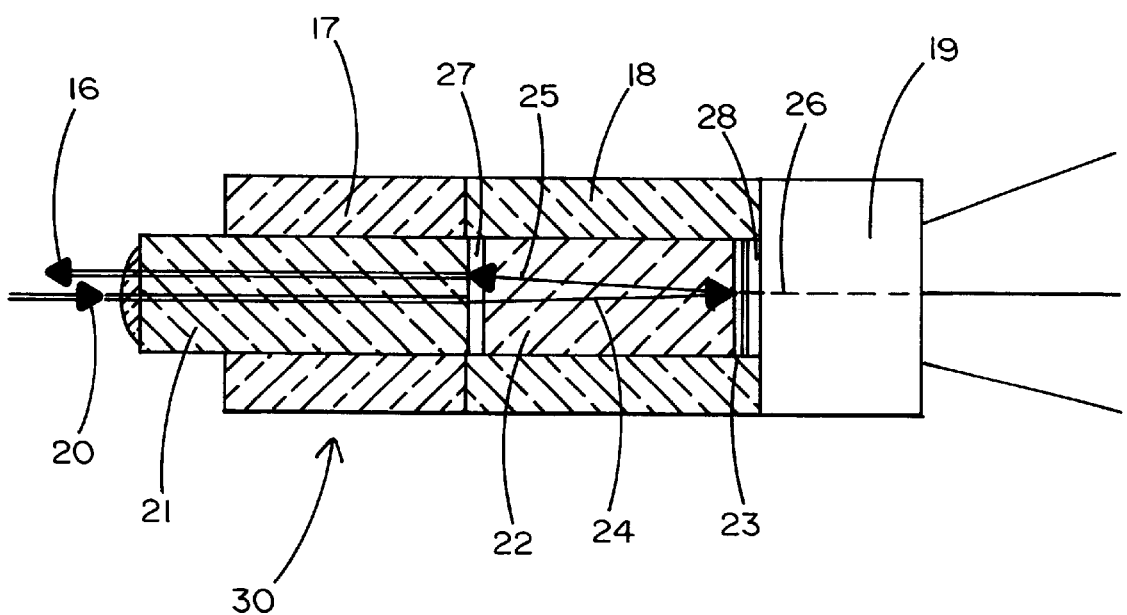
FIG. 3 is a cross-sectional drawing of a preferred embodiment of the present invention.

Reference will be made to FIG. 3 which illustrates a preferred embodiment of the present invention. An optical filtering assembly 30 used in the temperature compensated multi-port power-monitoring packages is described. The optical path of the inventive assembly comprises two optical glass fibers (input fiber 20 and reflective fiber 16) inserted into a multi-capillary glass ferrule 21 to provide a fiber-ferrule sub-assembly. Also included in the assembly is a collimating (GRIN or aspheric) lens 22 and a spectral shaping (reflecting) glass filter 23 which is coated directly onto the GRIN lens 22. The lens 22 collimates the light emitted from the input optical fiber 20 into parallel rays, which hit the filter element 23. The filter splits the input collimated light 24 into two beams 26 and 25. The transmitted beam 26 is a product specific percentage typically small (1% or less) of the total optical power. After the transmitted beam 26 passes through the filter element 23, it then enters a photon detector 19. The reflective beam 25 is reflected from the filter element 23 through the lens 22 into the reflective optical fiber 16. The optical components are assembled and aligned so that the transmitted and reflected light beams are collimated and their insertion losses (IL) are minimized. A small air gap 27 may be provided between the ferrule 21 and the lens 22. Another air gap 28 may be provided between the filter 23 and the detector 19.

The optical monitoring assembly 30 includes two aligned and bonded parts. The first part comprises the fiber-ferrule 21 telescopically embedded into a first thermally and structurally matched insulating and protective glass tube (enclosure) 17. The filter/partial mirror 23 is coated on lens 22 and is also telescopically embedded into a second thermally and structurally matched insulating and protective glass tube enclosure 18 such that the location of the fiber-ferrule 21 yields minimized insertion loss in the reflective fiber 16. The second assembly part comprises the photon detector 19 bonded to the axial end of the thermally matched glass enclosure 18. This second assembly part is aligned to maximize detectable optical power. The filter 23 is coated in a separate process with a partially reflective mirror surface. The parts are aligned to minimize the insertion losses (IL) in the transmitted and reflected light beams 25 and 26. To provide the full a-thermalization of the assembly, all components, are made from thermally well-matched glasses and a thermally and/or UV curable adhesive with low moisture diffusivity is used in all joints.

Figure 1:
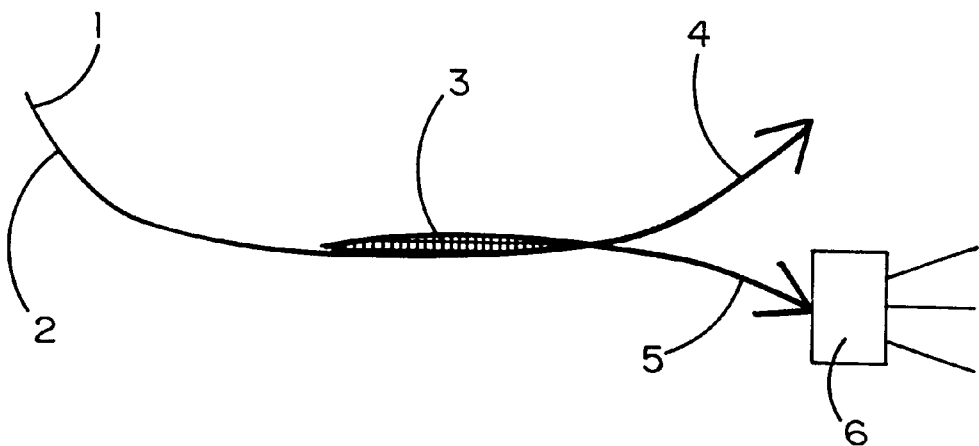
FIG. 1 is a prior art conceptual illustration of an optical power monitoring device in an optical fiber-based system.
Figure 2:
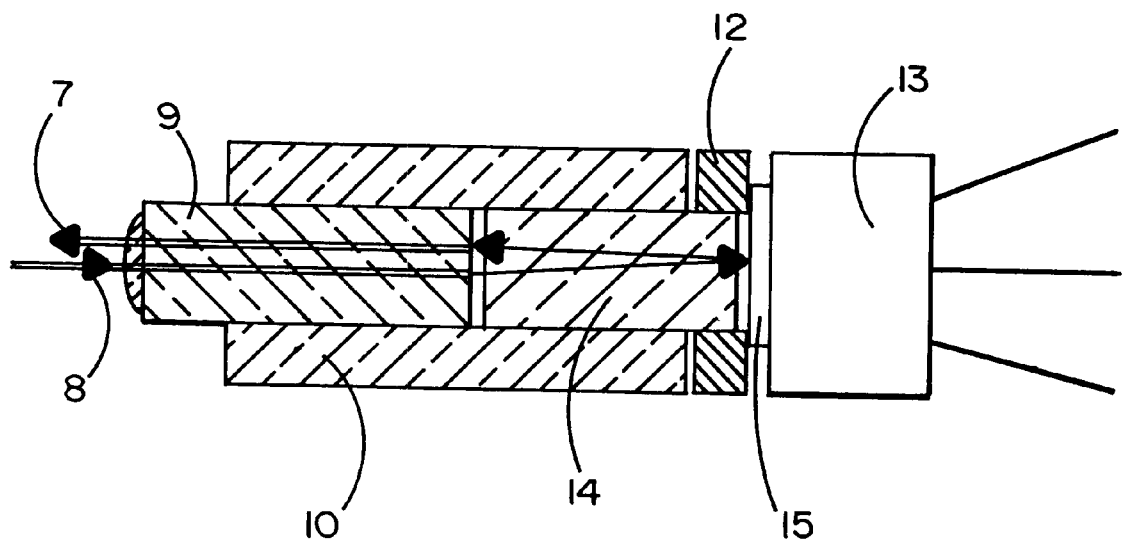
FIG. 2 is a prior art cross-sectional drawing of a conventional multi-port optical power monitoring assembly.

Thus it will be observed that the present invention differs from the prior art assembly of FIG. 2 in a number of aspects. Unlike the prior assembly, the inventive assembly employs two distinct thermally matched glass tube enclosures which are bonded to one another at their facing axial ends. A first such glass tube enclosure holds the fiber/ferrule assembly. A second such glass tube enclosure holds a collimating lens terminating in an integral filter having a partial mirror coating. The axial end of the second glass tube enclosure extends beyond the filter so that it may be bonded directly to the photon detector. Because of this configuration, the thin film filter and filter holder of the prior art assembly are obviated and the various components are all bonded directly to either the interior or axial ends of the glass tube enclosures.

The resulting design reduces assembly time, improves long term reliability and reduces the number of components, thus reducing cost.

Having thus disclosed an exemplary and preferred embodiment of the invention, it being understood that variations in the illustrated detailed structure are contemplated and therefore the scope hereof is limited only by the appended claims and their equivalents.

We claim:

1. An optical power monitor for connection between an input optical fiber and an output optical fiber for sampling a portion of the optical power transmitted therebetween and determining the optical power magnitude; the monitor comprising:

an optical fiber and ferrule assembly connected to said input and output optical fibers, respectively;

a first glass tube enclosure radially enclosing said assembly;

a collimating lens substantially adjacent said assembly for collimating light from said input optical fiber;

an optical filter configured as a partial mirror coating on an end of said collimating lens for passing said portion of said optical power and for reflecting the remainder of said optical power back through said collimating lens and into said output optical fiber;

a second glass tube enclosure radially enclosing said collimating lens including said optical filter and axially bonded to said first glass tube enclosure; and a photon detector substantially adjacent said filter and bonded to said second glass tube enclosure.

2. The optical power monitor recited in claim 1 wherein said first and second glass tube enclosures, said assembly and said collimating lens are made of thermally well-matched glasses.

3. The optical power monitor recited in claim 1 wherein said first and second glass tube enclosures are made of the same glass.

4. The optical power monitor recited in claim 1 further comprising a low-moisture diffusivity adhesive for bonding said first and second glass tube enclosures to one another and for bonding said photon detector to said second glass tube enclosure.

5. The optical power monitor recited in claim 1 wherein said fiber and ferrule assembly is telescopically embedded in said first glass tube enclosure.

6. The optical power monitor recited in claim 1 wherein said collimating lens is telescopically embedded in said second glass tube enclosure.

7. An optical power monitor for connection between an input optical fiber and an output optical fiber for sampling a portion of the optical power transmitted therebetween and determining the optical power magnitude; the monitor comprising:

an optical fiber and ferrule assembly connected to said input and output optical fibers, respectively;

a collimating lens substantially adjacent said assembly for collimating light from said input optical fiber;

an optical filter configured as a partially reflective mirror coating on an end of said collimating lens for passing said portion of said optical power and for reflecting the remainder of said optical power back through said collimating lens and into said output optical fiber;

a photon detector substantially adjacent to said filter; and at least one glass tube enclosure radially enclosing said assembly and said collimating lens and having an end bonded to said photon detector.

8. An optical power monitor for connection between an input optical fiber and an output optical fiber for sampling a portion of the optical power transmitted therebetween and determining the optical power magnitude; the monitor comprising:

an optical fiber and ferrule assembly connected to said input and output optical fibers, respectively;

a first glass tube enclosure radially enclosing said assembly;

a collimating lens substantially adjacent said assembly for collimating light from said input optical fiber;

an optical filter configured as a partial mirror coating on an end of said collimating lens for passing said portion of said optical power and for reflecting the remainder of said optical power back through said collimating lens and into said output optical fiber;

a second glass tube enclosure radially enclosing said collimating lens including said optical filter and axially bonded to said first glass tube enclosure; and a photon detector substantially adjacent said filter and bonded to said second glass tube enclosure.

9. A method of fabricating an optical power monitor for connection between an input optical fiber and an output optical fiber for sampling a portion of the optical power transmitted therebetween and determining the optical power magnitude; the method comprising the steps of:

a) providing a fiber and ferrule assembly for connection to said input and output optical fibers;

b) telescopically embedding said assembly into a first glass tube enclosure;

c) providing a collimating lens;

d) coating one end of said collimating lens with a partial mirror coating;

e) embedding said collimating lens in a second glass tube enclosure;

f) bonding said first glass tube enclosure to said second glass tube enclosure at respective facing axial ends;

g) providing a photon detector; and h) bonding said photon detector to said second glass tube enclosure.

10. The method recited in claim 9 wherein the bonding steps f) and h) are carried out by employing a thermally cured adhesive.

11. The method recited in claim 9 wherein the bonding steps f) and h) are carried out by employing an ultra-violet cured adhesive.

* * * * *